US010146777B2

(12) United States Patent
Tseng

(10) Patent No.: US 10,146,777 B2
(45) Date of Patent: Dec. 4, 2018

(54) SYNCHRONOUS DISPLAY OF PERSONAL AND CONTACT-SHARED CONTACT INFORMATION

(75) Inventor: Erick Tseng, San Francisco, CA (US)

(73) Assignee: Facebook, Inc., Menlo Park, CA (US)

(*) Notice: Subject to any disclaimer, the term of this patent is extended or adjusted under 35 U.S.C. 154(b) by 691 days.

(21) Appl. No.: 13/115,701

(22) Filed: May 25, 2011

(65) Prior Publication Data
US 2012/0303652 A1 Nov. 29, 2012

(51) Int. Cl.
G06F 17/30 (2006.01)

(52) U.S. Cl.
CPC .. *G06F 17/30032* (2013.01); *G06F 17/30035* (2013.01); *G06F 17/30581* (2013.01); *G06F 17/30702* (2013.01)

(58) Field of Classification Search
CPC ......... G06F 17/30702; G06F 17/30581; G06F 17/30032; G06F 17/30035; G06Q 30/02
See application file for complete search history.

(56) References Cited

U.S. PATENT DOCUMENTS

| 8,543,648 | B1* | 9/2013 | Rhodes ............ G06F 17/30958 707/798 |
| 2005/0091316 | A1* | 4/2005 | Ponce .................. H04L 63/104 709/205 |
| 2007/0162454 | A1* | 7/2007 | D'Albora ............... G06Q 10/10 707/999.01 |
| 2007/0192299 | A1* | 8/2007 | Zuckerberg et al. ............. 707/3 |
| 2007/0266118 | A1* | 11/2007 | Wilkins ............ G06F 17/30879 709/219 |
| 2008/0319652 | A1* | 12/2008 | Moshfeghi ......... G01C 21/3667 701/532 |
| 2009/0125521 | A1* | 5/2009 | Petty ................................ 707/9 |
| 2009/0171691 | A1* | 7/2009 | Lubarski et al. ................. 705/1 |
| 2009/0171979 | A1* | 7/2009 | Lubarski et al. .............. 707/10 |
| 2010/0024045 | A1* | 1/2010 | Sastry et al. .................... 726/28 |
| 2010/0083125 | A1* | 4/2010 | Zafar et al. ................... 715/739 |
| 2010/0211863 | A1* | 8/2010 | Jones et al. ................... 715/224 |
| 2010/0281113 | A1* | 11/2010 | Laine et al. .................. 709/204 |
| 2010/0306185 | A1* | 12/2010 | Smith et al. .................. 707/709 |
| 2011/0004922 | A1* | 1/2011 | Bono et al. ....................... 726/4 |
| 2011/0093498 | A1* | 4/2011 | Lunt ................. G06F 17/30864 707/769 |
| 2011/0167114 | A1* | 7/2011 | Blanchard et al. ........... 709/204 |
| 2011/0264684 | A1* | 10/2011 | Shafigi et al. ................ 707/769 |
| 2012/0054872 | A1* | 3/2012 | Belwal ............................ 726/26 |
| 2012/0089644 | A1* | 4/2012 | Doggett et al. .............. 707/780 |
| 2012/0117163 | A1* | 5/2012 | Lester et al. ................. 709/206 |
| 2012/0124059 | A1* | 5/2012 | Pratt et al. .................... 707/748 |
| 2012/0150955 | A1* | 6/2012 | Tseng ........................... 709/204 |

(Continued)

Primary Examiner — Dinku W Gebresenbet
(74) Attorney, Agent, or Firm — Baker Botts L.L.P.

(57) ABSTRACT

A social networking system allows a first user to provide contact information for a second user via a synchronization or upload event from a computing device. The second user is prompted as to whether he or she wishes to share the received contact information on his public profile. If he or she responds affirmatively, the updated contact information is stored in association with the second user's profile on the social networking system. If the user responds negatively, the contact information is stored on the social networking system in association with the uploading user.

19 Claims, 9 Drawing Sheets

(56) References Cited

U.S. PATENT DOCUMENTS

| | | | |
|---|---|---|---|
| 2012/0179764 A1* | 7/2012 | Erdal | H04L 63/101 709/206 |
| 2012/0197967 A1* | 8/2012 | Sivavakeesar | 709/203 |
| 2014/0019409 A1* | 1/2014 | Tseng et al. | 707/609 |

* cited by examiner

SOCIAL NETWORK CONTACTS

| NAME 402a | PHONE # | ADDRESS | EMAIL | FB ID # |
|---|---|---|---|---|
| EARL WAY | 555.123.4567 | 123 PINE | EWay@... | 0112457739515 |
| JEFF WHITE | 555.987.6543 | 888 HOLT | Jwhite@... | 0234567898765 |

FIGURE 4A

LOCAL VIEW

| NAME | PHONE # | ADDRESS | EMAIL | FB ID # |
|---|---|---|---|---|
| MOM | 123.456.7890 | 2114.... | | <NONE> |
| ⋮ | ⋮ | ⋮ | ⋮ | ⋮ |
| JEFF WHITE | *555.987.6555 | ... | ... | 0234567898765 |
| UNITED AIRLINES | 1.800.111.1111 | | | <NONE> |

FIGURE 4B

SYNCHRONOUS DISPLAY OF PERSONAL AND CONTACT-SHARED CONTACT INFORMATION

TECHNICAL FIELD

The present disclosure relates generally to a social networking service and, more particularly to, a system for updating contact information for members of the social networking service.

BACKGROUND

A social networking system, such as a social networking website, enables its users to interact with it and with each other through the system. The user profile may include a user's demographic information, contact information, and personal interests. Users may install a software application or client on their mobile phone that allows them to remotely interact with the social network via their mobile data connection.

SUMMARY

Particular embodiments relate to receiving from a first user contact information for a second user of the social network, determining whether the contact information is already included in the second user's profile, automatically prompting the second user as to whether to add the new contact information, and, dependent on the response to the prompt, adding the information to the second user's profile or a private data structure of the first user. These and other features, aspects, and advantages of the disclosure are described in more detail below in the detailed description and in conjunction with the following figures.

BRIEF DESCRIPTION OF THE DRAWINGS

FIGS. 4A and 4B illustrate public-view and private-view server-side data structures for a user's phonebook.

DETAILED DESCRIPTION

Figure 1:
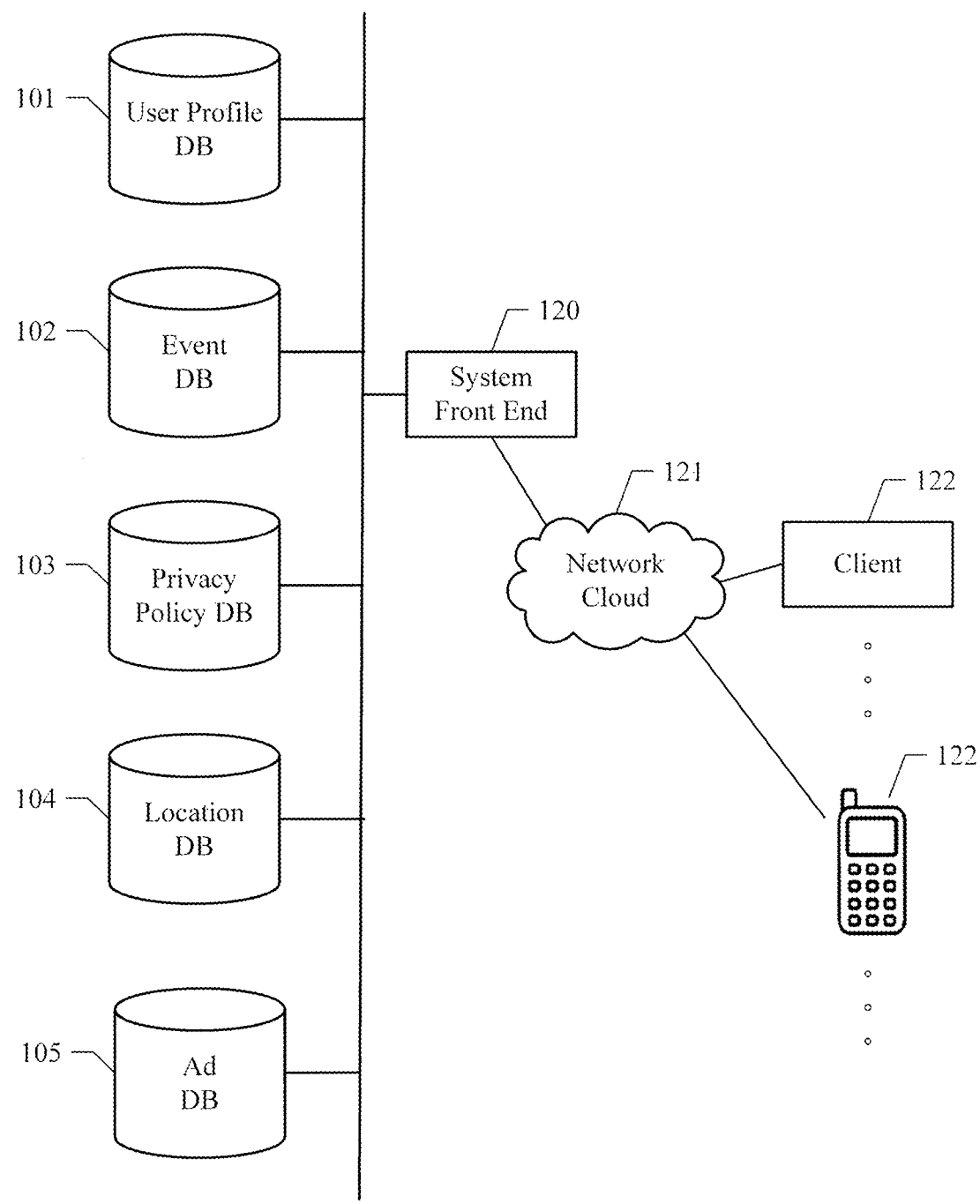
FIG. 1 illustrates an example social networking system.

The invention is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a correct login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

A social networking system may support a variety of applications, such as photo sharing, on-line calendars and events. For example, the social networking system may also include media sharing capabilities. For example, the social networking system may allow users to post photographs and other multimedia files to a user's profile, such as in a wall post or in a photo album, both of which may be accessible to other users of the social networking system. Social networking system may also allow users to configure events. For example, a first user may configure an event with attributes including time and date of the event, location of the event and other users invited to the event. The invited users may receive invitations to the event and respond (such as by accepting the invitation or declining it). Furthermore, social networking system may allow users to maintain a personal calendar. Similarly to events, the calendar entries may include times, dates, locations and identities of other users.

The social networking system may also support a privacy model. A user may or may not wish to share his information with other users or third-party applications, or a user may wish to share his information only with specific users or third-party applications. A user may control whether his information is shared with other users or third-party applications through privacy settings associated with his user profile. For example, a user may select a privacy setting for each user datum associated with the user and/or select settings that apply globally or to categories or types of user profile information. A privacy setting defines, or identifies, the set of entities (e.g., other users, connections of the user, friends of friends, or third party application) that may have access to the user datum. The privacy setting may be specified on various levels of granularity, such as by specifying particular entities in the social network (e.g., other users), predefined groups of the user's connections, a particular type of connections, all of the user's connections, all first-degree connections of the user's connections, the entire social network, or even the entire Internet (e.g., to make the posted content item index-able and searchable on the Internet). A user may choose a default privacy setting for all user data that is to be posted. Additionally, a user may specifically exclude certain entities from viewing a user datum or a particular type of user data.

Users of the social network may install a software application on their mobile device to access the social network. Mobile devices may include cellular phones, smart phones, tablet PCs, satellite phones, and the like. Furthermore, users may update contact information from other computing device. For example, a PC with voice-over-IP (VoIP) software allows it to store contact information and dial to a land line or mobile phone. Even a PC lacking such a connection may still store a phone number in association with a user of a social network (i.e., in Microsoft Outlook or other contact management software).

FIG. 1 illustrates an example social networking system. In particular embodiments, the social networking system may store user profile data and social graph information in user profile database 101. In particular embodiments, the social networking system may store user event data in event database 102. For example, a user may register a new event by accessing a client application to define an event name, a time and a location, and cause the newly created event to be stored in event database 102. In particular embodiments, the social networking system may store user privacy policy data in privacy policy database 103. In particular embodiments, the social networking system may store geographic and location data in location database 104. In particular embodiments, the social networking system may store advertisement data in advertisement database 105. For example, an advertiser may store advertisement content (e.g., messages, graphic arts, video clips) and related information (e.g., locations, targeting criteria) in advertisement database 105. In particular embodiments, databases 101, 102, 103, 104, and 105 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

Figure 2A:
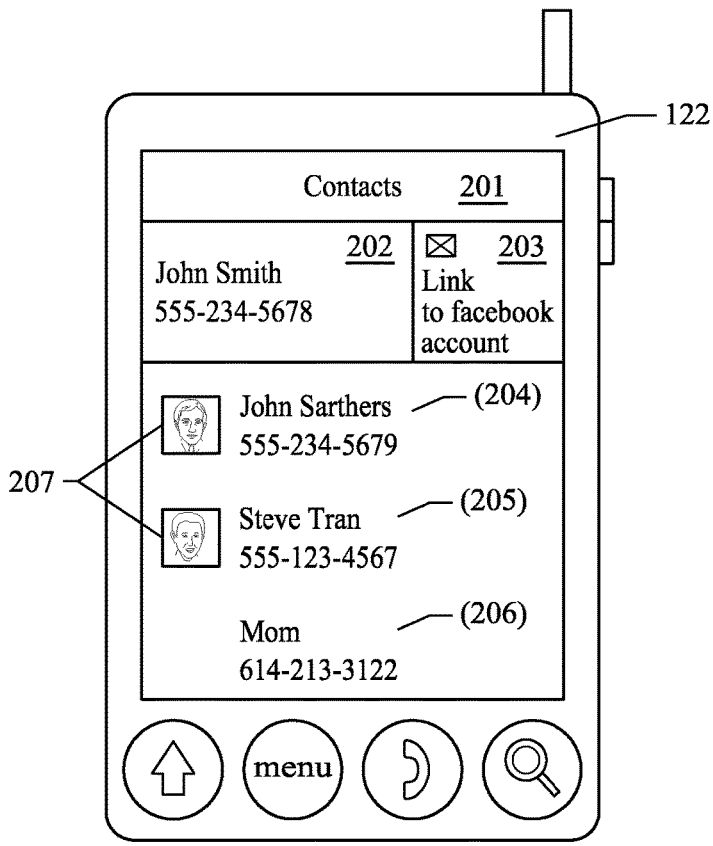
FIGS. 2A and 2B illustrate example computing devices with one or more local contacts linked to users of a social networking system.

FIG. 2A illustrates a client device 122 that is capable of being synchronized (synced) with social network profile database 101. In this illustration, client device 122 is a mobile device such as a cellular phone, smart phone, or tablet PC. Client device 122 includes a "contacts" application 201 that allows the user of client device 122 to view and edit saved contact information. Particular contacts applications 201 are linked with the user's account information on the social networking system. Within the list of contacts in contacts application 201, the user may have stored contacts that are linked to their connections, or "friends", on the social network, such as contacts 204 and 205. In particular embodiments, when a contact is linked to a social network connection, an icon 207 is displayed. In particular embodiments, this icon is the profile picture for the connection stored in social network profile database 101. In particular embodiments, when contacts application 201 detects similarities between a locally-stored contact on client device 122 and one of the user's connections on the social networking system, contacts application 201 may provide an button 203 to link the locally-stored contact with the identifier of the connection on the social network, such as the connection's social networking identification number. Contacts application 201 may also include contacts that are not linked to any connection on the social networking system, and whose name or other information bears no similarity to any of the user's connections on the social networking system, such as contact 206 ("Mom"). In particular embodiments, contact 206 may also include a button 203 that allows the user to link the contact to one of his or her connections on the social networking system. Irrespective of how the locally-stored contact information is linked with a user on the social network, once the linkage is established, the user may sync his locally-stored contact information with social network profile database 101. In particular embodiments, the synchronization occurs when the user signs into the social networking site via a client application. In particular embodiments, the synchronization occurs when the user signs into the social networking site via a mobile browser. In particular embodiments, the synchronization occurs the moment the local contact is linked to a member of the social network. In particular embodiments, the user is prompted as to whether to synchronize his contacts list. In particular embodiments, the synchronize occurs in the background without any indication to the user.

Figure 2B:
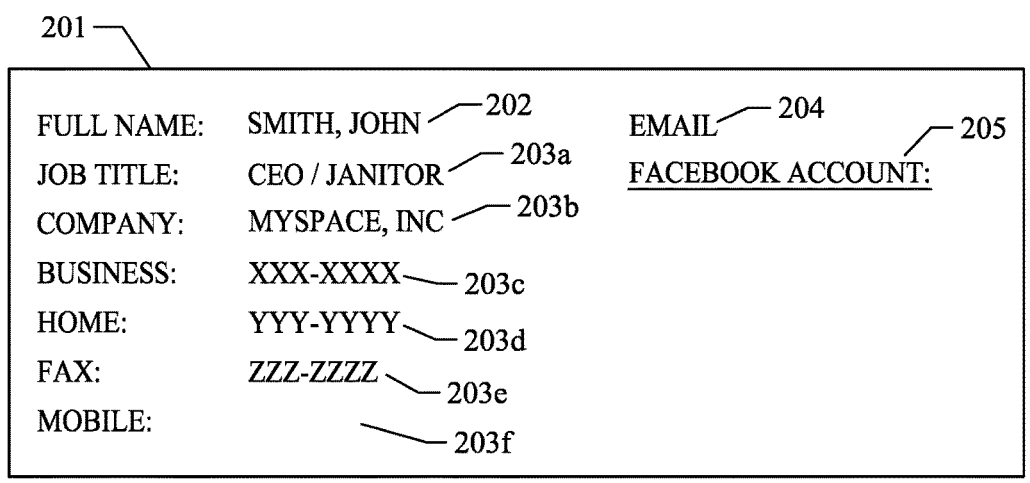

FIG. 2B illustrates another method of synchronizing locally-stored contact information with contact information stored on the social networking site. FIG. 2B shows an "edit contact" view in an application 201, such as MICROSOFT OUTLOOK, MOZILLA THUNDERBIRD, or the like. Application 201 may reside locally on the user's computing device, or may reside on another server or network cloud, such as the contacts organizer in Google's web-based Gmail application. In particular embodiments, application 201 includes an entry for a particular contact 202, including editable fields 203a-f for contact 202's job title, company, business phone, home phone, fax number, and mobile phone number. This disclosure contemplates any number of freely editable fields. In particular embodiments, this information is auto-filled by importing a CSV file. Application 201 also includes a field 204 for user 202's e-mail address. In particular embodiments, application 201 includes a field 205 for linking user 202 with a specific member of the social networking web site. In particular embodiments, the user of application 201 selects from a list of his or her friends on the social networking website. In particular embodiments, application 201 searches for email addresses or contact information matching that of the users of application 201's friends' on the social networking website, and automatically links user 202 with a specific member of the social networking website if the information matches. In particular embodiments, application 201 automatically synchronizes by uploading to the social networking system periodically, or when the user of application 201 logs into the social networking website. In particular embodiments, this sync occurs manually when the user uploads a CSV file of its contacts, or a formatted data table, such as a MICROSOFT EXCEL file of user contacts. This disclosure contemplates any method of linking local users to members of the social networking website, and synchronizing data residing off the social networking system with the social networking system's servers.

Figure 3:
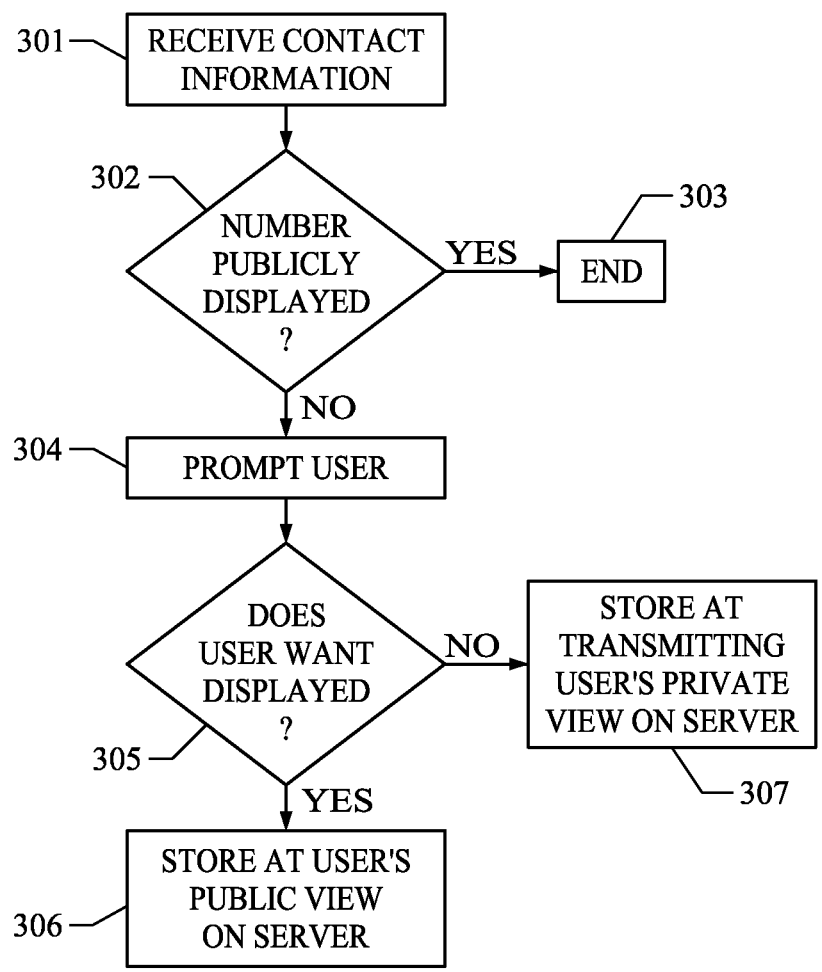
FIG. 3 illustrates an example method of updating contact information for a second user uploaded by a first user.

FIG. 3 is a flowchart of an example method of updating contact information for a second user uploaded by a first user. At step 301, the social networking system receives contact information for a specific user. The information may be received as part of a synchronization event, as disclosed above, or manually entered. The contact information is generally a phone number, but may also include other types of contact information, such as instant messenger handles, e-mail addresses, physical mail addresses, or any other method of otherwise identifying or communicating with a member of the social networking website.

At step 302, an application residing on one or more of the social networking system's servers checks the public profile of the member whose contact information has been uploaded. In particular embodiments, the application checks profile database 101 as well as the privacy settings of the member in question to determine if the received contact information matches any contact information publicly displayed on the member's profile.

If the contact information is already publicly displayed, the process ends at step 303. If the received contact information is not already publicly displayed, at step 304, the application residing in one or more servers of the social networking system prompts the member of the social networking site whether he or she wishes to publicly display the received contact information on his or her profile. This disclosure contemplates a variety of different prompts. In particular embodiments, the prompt is a notification displayed to the users when he or she logs into the social networking web site. In particular embodiments, the prompt is a message to the member displayed when he or she logs into the social networking website. In particular embodiments, the prompt is a short messaging service (SMS) message or a text message delivered to the mobile phone associated with the member's account. In particular embodiments, the prompt is an e-mail delivered to the e-mail address associated with the member's account. In particular embodiments, the prompt is an instant message delivered to an instant messaging client. In particular embodiments, one or more prompts is delivered across multiple channels of communication.

At step 305, the social networking system receives a response from the prompted member. This disclosure contemplates any manner of receiving a response from the prompted member. For example, if the member is prompted via SMS message, the message may include directions for responding such as "reply with '1' for 'yes' and '2' for 'no'." In particular embodiments, the user may respond via a browser on a computing device. In particular embodiments, the user may respond via a dedicated application on a computing device. In other embodiments the user may respond by voice. In particular embodiments, the user may respond by e-mail. This disclosure envisions multiple methods of receiving a response to the prompt known to those of ordinary skill in the art.

At 306, upon receiving a response that the member wishes to share the received contact information, the application updates the entry for the member in profile database 101 with the received contact information. The new contact information is displayed to visitors of the member's profile page. In particular embodiments, the new contact information is subject to the member's existing privacy setting. In particular embodiments, the new contact information is publicly viewable by all members of the social networking system. In particular embodiments, the user is further prompted to define the privacy setting for the new contact information. This disclosure contemplates any manner of privacy or visibility settings for the updated contact information.

If the user responds that he or she does not want the new contact information displayed publicly, at step 307, the contact information is still saved in profile database 101. However, it is saved in connection with the transmitting user's private view, meaning the transmitting user may see the contact information he or she uploaded to the social networking service for an associated member, but other users, including the member itself, cannot. FIGS. 4A and 4B discuss the public-view and private-view data structures stored in profile database 101 in further detail.

FIG. 4A illustrates a data structure representing a particular user's public-view phonebook 401 stored in profile database 101. The data structure comprises a table that includes multiple users 404 and 405, and for each user, a plurality of fields 402*a-d*, including but not limited to the user's name, phone number, address, and e-mail address. Column 403 includes a unique identifier that identifies the user's account on the social network. When a user requests to view his social networking phonebook (FIG. 5), an application on one or more servers of the social networking system populates this table with public information from the profiles of each of member 404 and 405. (For didactic purposes, only two members are shown). Public-view phonebook 401 is populated with data from profile database 101 for each member that is public to all users, or data that the user may access. For example, if member 404's privacy settings do not allow the user to view his e-mail address, field 402*d* for member 404 will be empty. In particular embodiments, public-view phonebook 401 is populated at the time a user requests to view his or her phonebook on the social networking site, and is therefore up-to-date with regard to recent friend additions or removals.

FIG. 4B illustrates a data structure representing a particular user's private-view phonebook 402 stored in profile database 101. Each user of the social network has a unique private-view phonebook data structure stored in profile database 101. The data structure also comprises a table that includes multiple users 406, 407, and 409. Similarly, the data structure includes fields 402*a-d* corresponding to the user name, phone number, address, and e-mail address of each user, respectively. Users 406 and 409 are contacts that were synced from the user's computing device that do not have an associated social network unique identifier, as shown by the "none" values for field 403. These are contacts that the user may have stored on his computing device or mobile phone, such as "Mom" 406 and "United Airlines" 409, that are not linked to any particular member of the social network. The data structure representing a particular user's private-view phonebook 402 may also include a contact 407 who is linked to a member of the social networking system, as represented by the unique identifier contained in field 403. However, private-view phonebook data structure 402 will only contain contacts linked to a member of the social networking system if the user has uploaded or synced additional contact information for the member, and the member opted not to store the contact information on his or her profile. For example, the user uploaded an additional phone number for member 407, and member 407 opted not to share the uploaded phone number on his or her profile page. As described with reference to step 307, the uploaded phone number is stored in the transmitting user's private-view phonebook data structure as entry 408. Because private-view phonebook data structure 402 is only accessible by the uploading user, no other user may access the number, despite the fact that it is stored on the social networking system's servers. In particular embodiments, a particular users' private-view phonebook data structure 402 is merely the delta of the user's uploaded or synced data and the public-view phonebook data structure 401.

In particular embodiments, the contact information is stored in a temporary cache until a response to the prompt is received from the member. In particular embodiments, the contact information is stored by default to the member's public profile. In particular embodiments, the contact information is stored by default to the sending user's private-view phonebook data structure.

Figure 5:
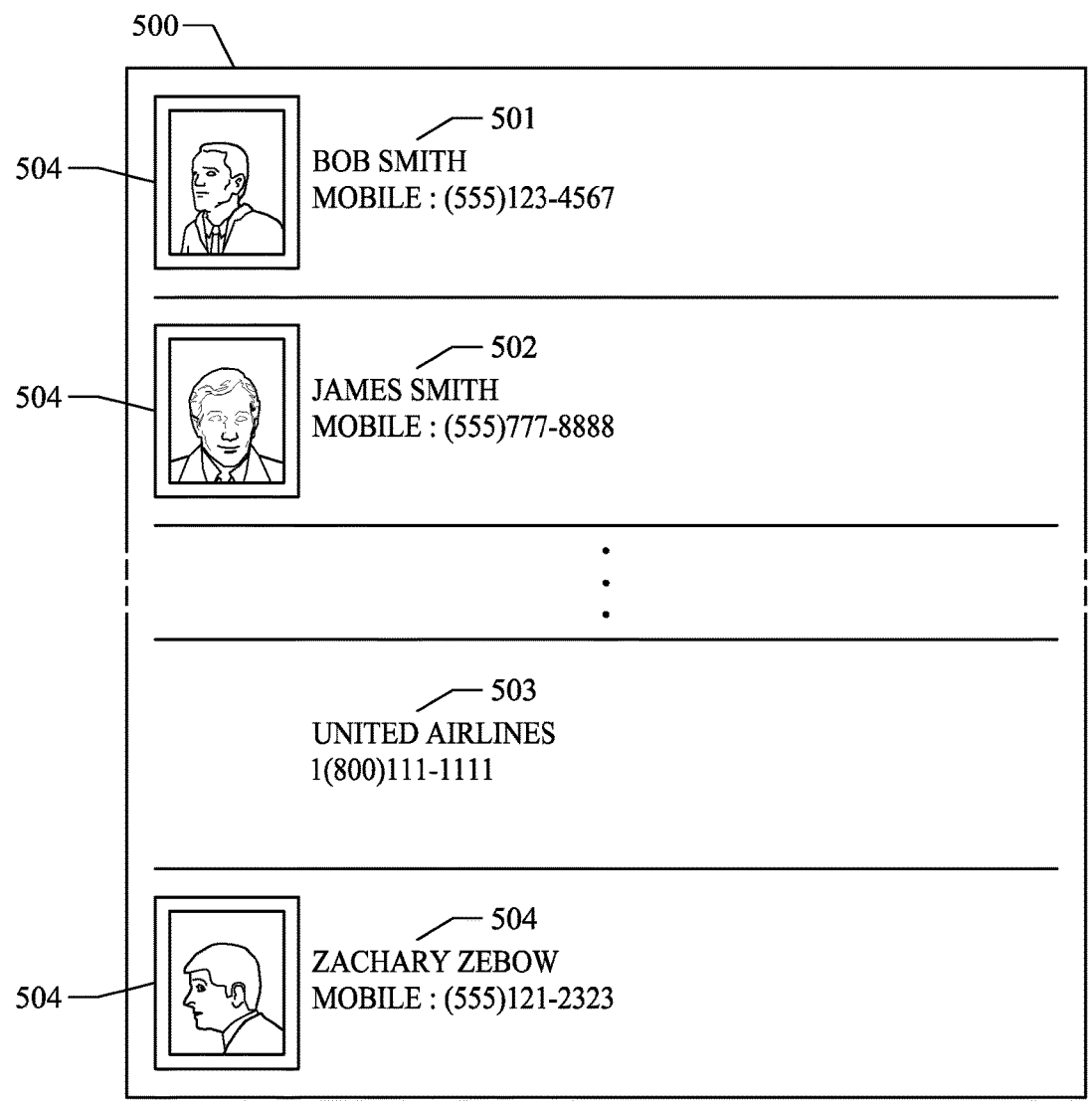
FIG. 5 illustrates an example web page presented to a user of the social network when he or she accesses her phonebook on the social networking site.

FIG. 5 illustrates an example social network phonebook presented to a particular user. In particular embodiments, the particular user may access this phonebook by pointing a browser on a computing device to a specific URL. In particular embodiments, the user may access the phonebook from a dedicated application residing on a computing device. Phonebook 500 is tailored to a particular user, and comprises the union of the data stored in the user's public-view phonebook data structure 401 and private-view phonebook data structure 402. Phonebook 500 includes data that is both publicly available for each of the user's friends, as well as private data only available to the particular user. Contacts 501, 502, and 504 are linked to members of the social networking system. In particular embodiments, when a contact is linked to a member of the social networking system, their profile picture is displayed next to their name. In particular embodiments, the user may upload a profile picture for contacts who are not linked to members of the social networking site. In particular embodiments, the fact that a contact is linked with a member of the social networking site is visually represented by a border around the contact's profile picture, or other indicia. Phonebook 500 also includes contacts who are not linked to members of the social networking site, such as contact 503 ("United Airlines"). Thus, phonebook 500 presents the user with a convenient method of viewing contact information for all his or her contacts, both on and off the social network. Additionally, phonebook 500 integrates private data a user may have for a particular member of the social network that the particular member has not chosen to share with others. All of the data for all of the user's contacts is conveniently aggregated on the servers of the social networking system.

Figure 6:
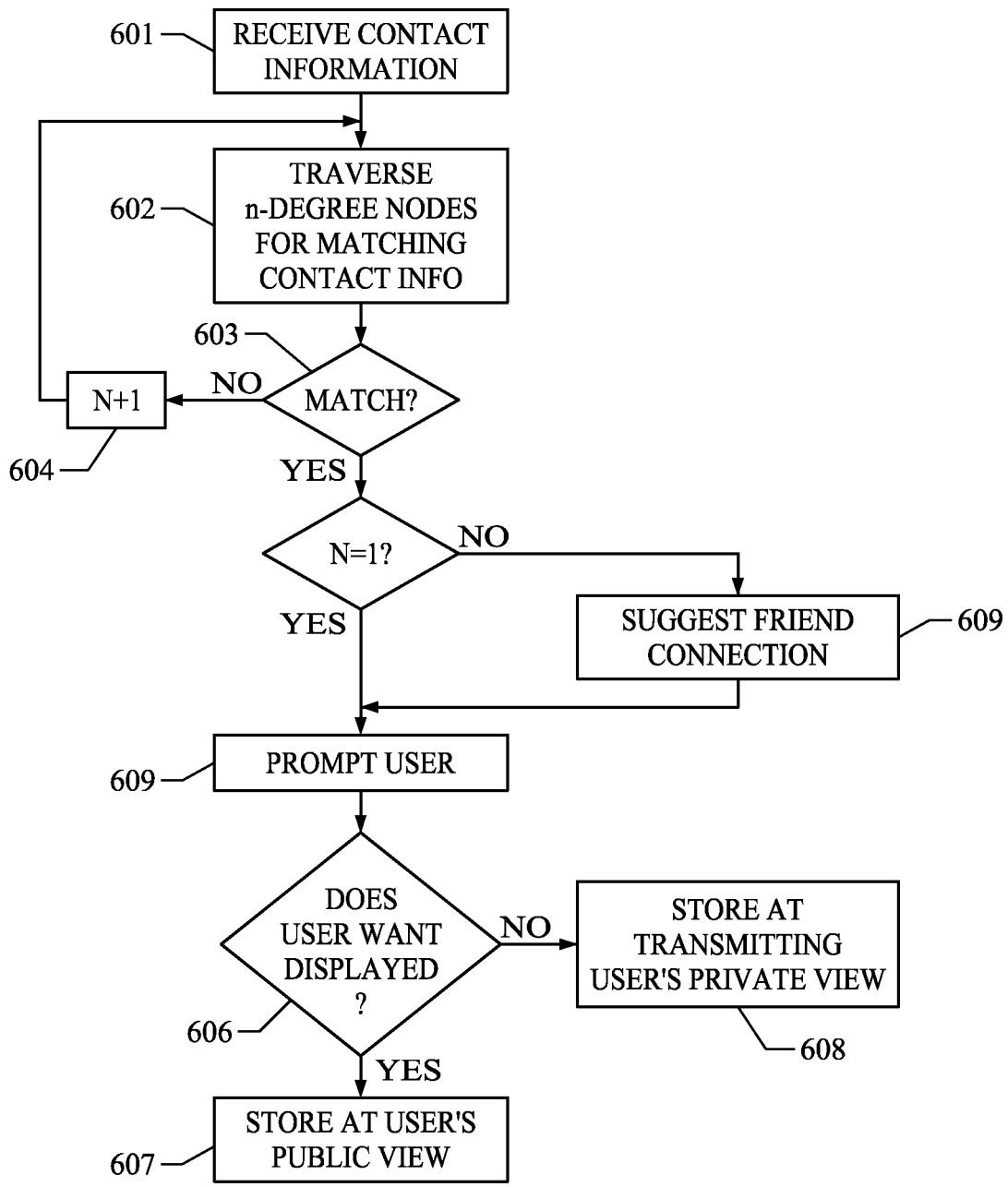
FIG. 6 illustrates a particular embodiment of the present invention that requires no linkage on the computing device of the uploading user between his or her contacts and friends on the social network.

FIG. 6 illustrates a particular embodiment of the present invention that requires no linkage on the computing device of the uploading user between his or her contacts and friends on the social network. At step 601, the user uploads contact information as described with reference to FIG. 1. In particular embodiments, all contacts are uploaded only the first time the user synchronizes with the social networking system, and subsequent synchronizations only upload contact information not found in the user's social network phonebook 500.

At step 602, for a given piece of received contact information, one or more applications residing on the servers of the social networking system traverses the uploading user's first degree contacts in a social graph. In particular embodiments, each first-degree contact may be represented in the social graph as a user node. For each first-degree contact, the application compares the uploaded contact information with contact information stored in the profile of the first-degree contact. After traversal of all first degree contact user nodes without a match, the application at 604 increments the degree of the search, and the process returns to step 602. At step 602, the application traverses all second-degree contact user nodes in the social graph and searches for a match to the uploaded contact information. In particular embodiments, this iterative process may repeat in an unbounded fashion, so that, if the uploaded contact information matches ANY contact information stored in association with any user of social network, the match will eventually be located. In particular embodiments, the application may impose an upper limit to the degrees of the search such as 3 degrees of connectivity.

If a match is found in the uploading user's first degree connections, the method proceeds to step 604. Step 604 is identical to step 304 of FIG. 3, and all subsequent steps are performed identically. If, however, a match is found in the uploading user's second-degree and higher connections, the method proceeds to step 605.

At step 605, the application determines that the uploading user has contact information for another member of the social networking system, and the user and the member have not connected as friends. In response, the application transmits a friend suggestion to one or both of the uploading user and the member. In particular embodiments, the friend suggestion to the member includes a prompt whether to add the uploaded contact information to the member's profile. After the friend connection is established, the process proceeds to step 604. In particular embodiments, this process occurs at the moment a friend connection is made (i.e., when a friend request is accepted).

Figure 7:
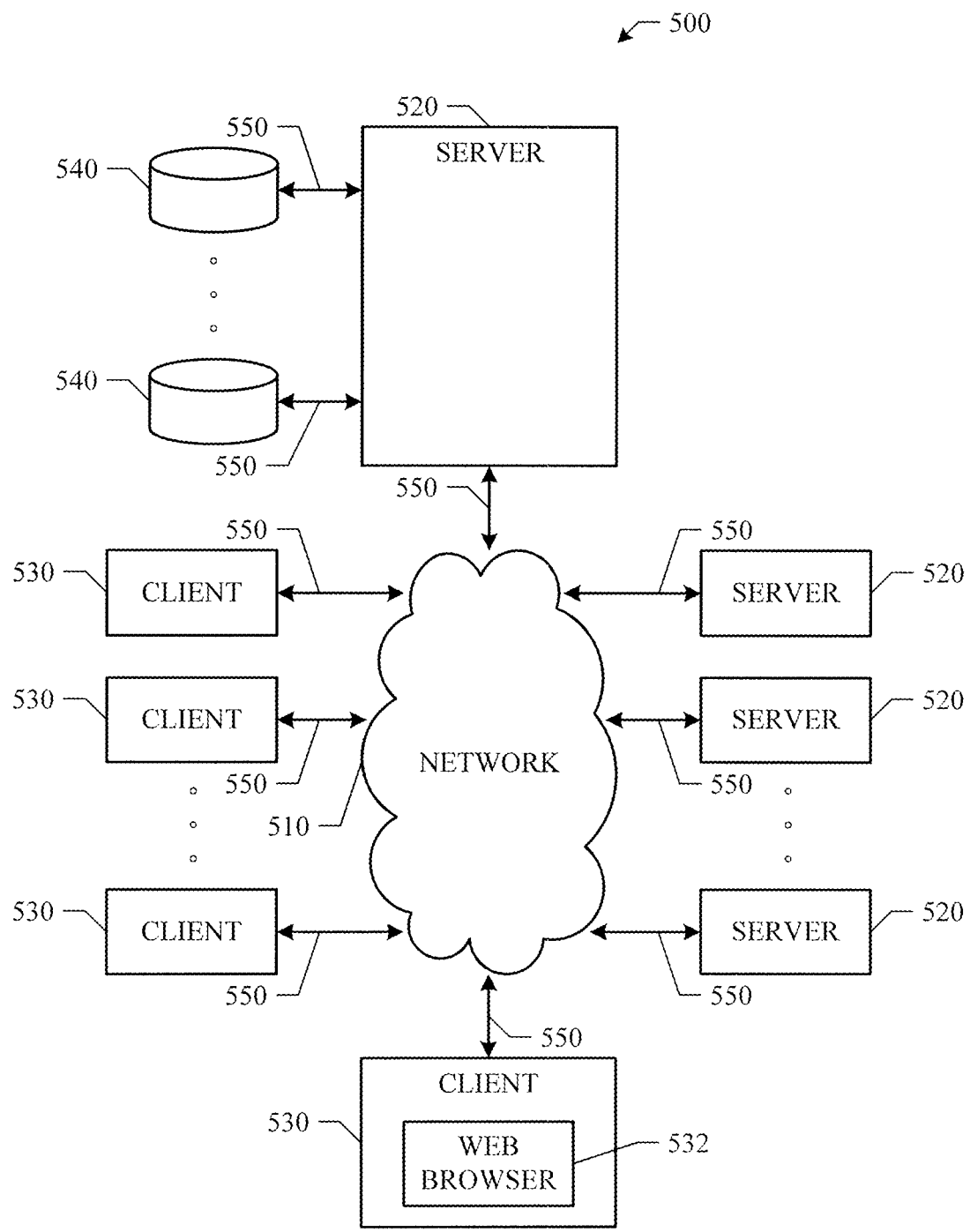
FIG. 7 illustrates an example network environment

While the foregoing embodiments may be implemented in a variety of network configurations, the following illustrates an example network environment for didactic, and not limiting, purposes. FIG. 7 illustrates an example network environment 700. Network environment 700 includes a network 710 coupling one or more servers 720 and one or more clients 730 to each other. Network environment 700 also includes one or more data storage 740 linked to one or more servers 720. Particular embodiments may be implemented in network environment 700. For example, social networking system frontend 120 may be written in software programs hosted by one or more servers 720. For example, event database 102 may be stored in one or more storage 740. In particular embodiments, network 710 is an intranet, an extranet, a virtual private network (VPN), a local area network (LAN), a wireless LAN (WLAN), a wide area network (WAN), a metropolitan area network (MAN), a portion of the Internet, or another network 710 or a combination of two or more such networks 710. The present disclosure contemplates any suitable network 710.

One or more links 750 couple a server 720 or a client 730 to network 710. In particular embodiments, one or more links 750 each includes one or more wired, wireless, or optical links 750. In particular embodiments, one or more links 750 each includes an intranet, an extranet, a VPN, a LAN, a WLAN, a WAN, a MAN, a portion of the Internet, or another link 750 or a combination of two or more such links 750. The present disclosure contemplates any suitable links 750 coupling servers 720 and clients 730 to network 710.

In particular embodiments, each server 720 may be a unitary server or may be a distributed server spanning multiple computers or multiple datacenters. Servers 720 may be of various types, such as, for example and without limitation, web server, news server, mail server, message server, advertising server, file server, application server, exchange server, database server, or proxy server. In particular embodiments, each server 720 may include hardware, software, or embedded logic components or a combination of two or more such components for carrying out the appropriate functionalities implemented or supported by server 720. For example, a web server is generally capable of hosting websites containing web pages or particular elements of web pages. More specifically, a web server may host HTML files or other file types, or may dynamically create or constitute files upon a request, and communicate them to clients 730 in response to HTTP or other requests from clients 730. A mail server is generally capable of providing electronic mail services to various clients 730. A database server is generally capable of providing an interface for managing data stored in one or more data stores.

In particular embodiments, one or more data storages 740 may be communicatively linked to one or more servers 720 via one or more links 750. In particular embodiments, data storages 740 may be used to store various types of information. In particular embodiments, the information stored in data storages 740 may be organized according to specific data structures. In particular embodiment, each data storage 740 may be a relational database. Particular embodiments may provide interfaces that enable servers 720 or clients 730 to manage, e.g., retrieve, modify, add, or delete, the information stored in data storage 740.

In particular embodiments, each client 730 may be an electronic device including hardware, software, or embedded logic components or a combination of two or more such components and capable of carrying out the appropriate functions implemented or supported by client 730. For example and without limitation, a client 730 may be a desktop computer system, a notebook computer system, a netbook computer system, a handheld electronic device, or a mobile telephone. The present disclosure contemplates any suitable clients 730. A client 730 may enable a network user at client 730 to access network 730. A client 730 may enable its user to communicate with other users at other clients 730.

A client 730 may have a web browser 732, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at client 730 may enter a Uniform Resource Locator (URL) or other address directing the web browser 732 to a server 720, and the web browser 732 may generate a Hyper Text Transfer Protocol (HTTP) request and communicate the HTTP request to server 720. Server 720 may accept the HTTP request and communicate to client 730 one or more Hyper Text Markup Language (HTML) files responsive to the HTTP request. Client 730 may render a web page based on the HTML files from server 720 for presentation to the user. The present disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 8:
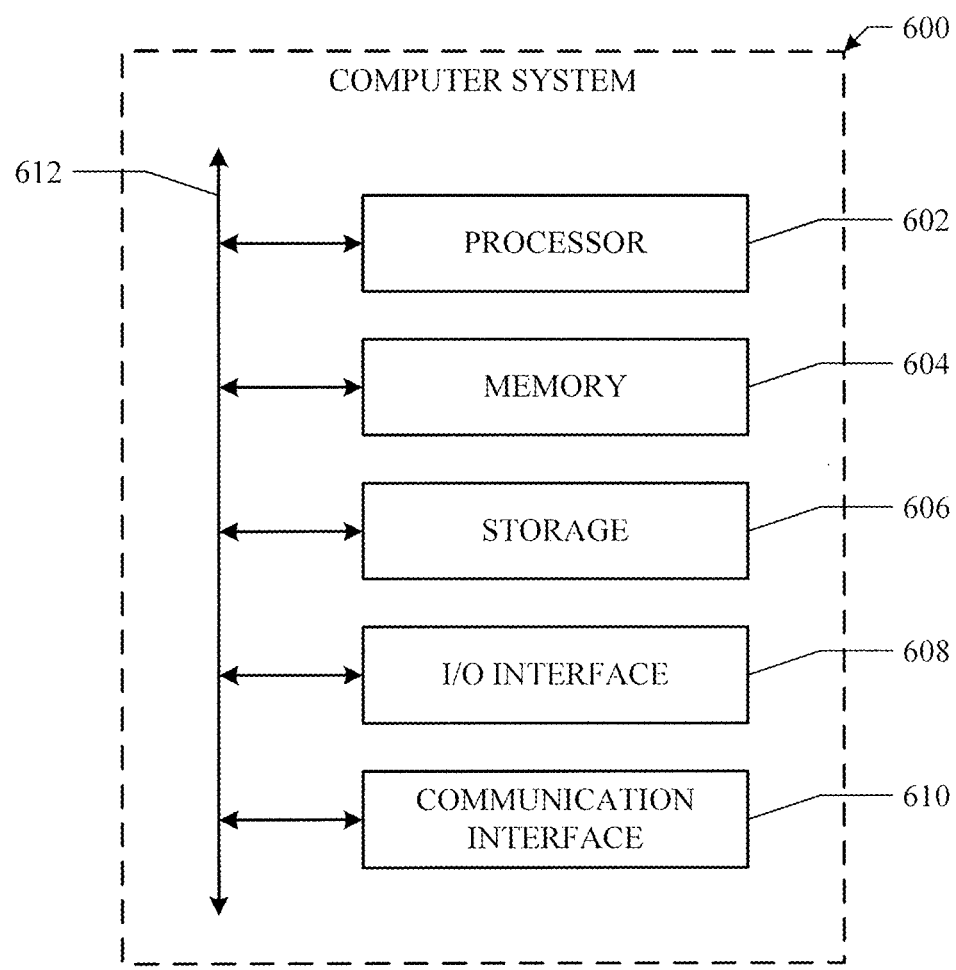
FIG. 8 illustrates an example computer system.

FIG. 8 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 806, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. The present disclosure contemplates processor 802 including any suitable number of any suitable internal caches, where appropriate. As an example and not by way of limitation, processor 802 may include one or more instruction caches, one or more data caches, and one or more translation look-aside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. The present disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. The present disclosure contemplates any suitable RAM. Memory 804 may include one or more memories 802, where appropriate. Although this disclosure describes and illustrates particular memory, this disclosure contemplates any suitable memory.

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 806 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 806 for them. Where appropriate, I/O interface 806 may include one or more device or software drivers enabling processor 802 to drive one or more of these I/O devices. I/O interface 806 may include one or more I/O interfaces 806, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

This disclosure contemplates one or more computer-readable storage media implementing any suitable storage. In particular embodiments, a computer-readable storage medium implements one or more portions of processor 802 (such as, for example, one or more internal registers or caches), one or more portions of memory 804, one or more portions of storage 806, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

The client-side functionality described above can be implemented as a series of instructions stored on a computer-readable storage medium that, when executed, cause a programmable processor to implement the operations described above.

Figure 9:
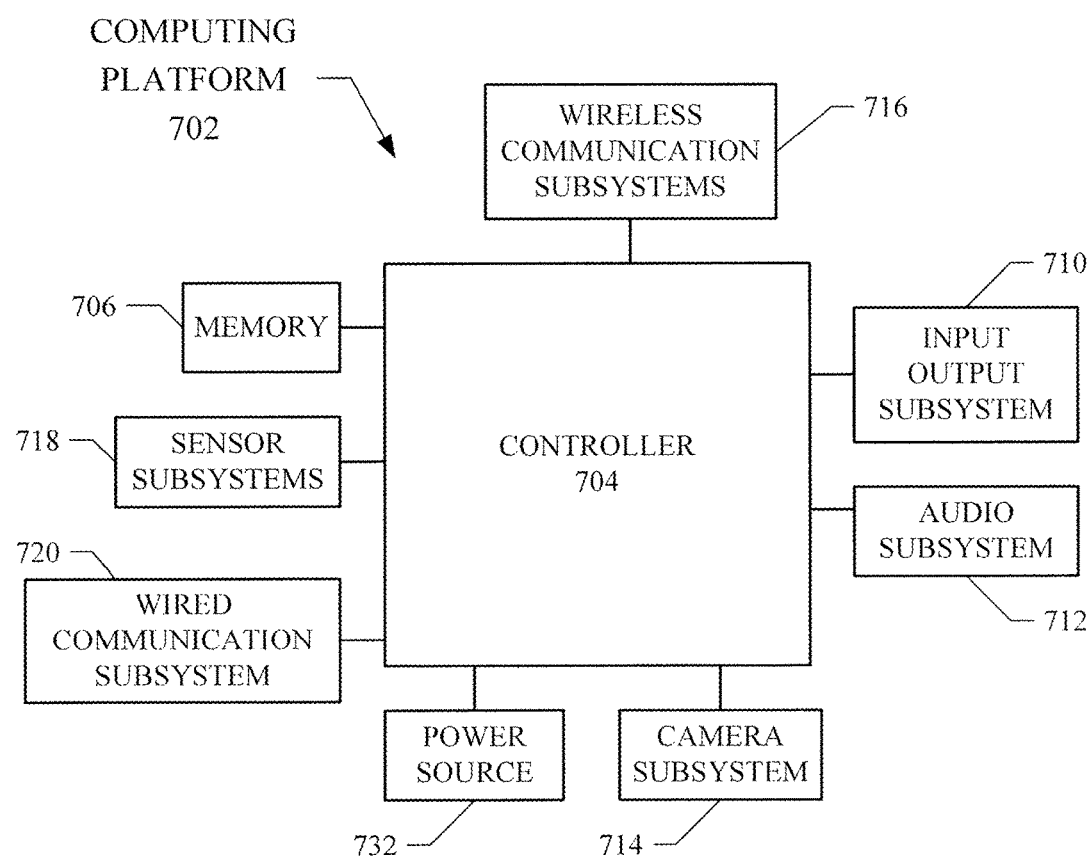
FIG. 9 illustrates an example mobile device platform.

While the client device 122 may be implemented in a variety of different hardware and computing systems, FIG. 9 shows a schematic representation of the main components of an example computing platform 902, according to various particular embodiments. Multipoint sensing devices generally include a controller 904 which may comprise a microcontroller or one or more processors configured to execute instructions and to carry out operations associated with a computing platform. In various embodiments, controller 904 may be implemented as a single-chip, multiple chips and/or other electrical components including one or more integrated circuits and printed circuit boards. Controller 904 may optionally contain a cache memory unit for temporary local storage of instructions, data, or computer addresses. By way of example, using instructions retrieved from memory, controller 904 may control the reception and manipulation of input and output data between components of computing platform 902.

Controller 904 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code (including control client 908 described below) and/or data may be physically stored within a memory block 906 that is operatively coupled to controller 904.

Memory block 906 encompasses one or more storage media and generally provides a place to store computer code (e.g., software and/or firmware) and data that are used by the computing platform 902. By way of example, memory block 906 may include various tangible computer-readable storage media including Read-Only Memory (ROM) and/or Random-Access Memory (RAM). As is well known in the art, ROM acts to transfer data and instructions uni-directionally to controller 904, and RAM is used typically to transfer data and instructions in a bi-directional manner. Memory block 906 may also include one or more fixed storage devices in the form of, by way of example, solid-state hard disk drives (HDDs), among other suitable forms of memory coupled bi-directionally to controller 904. Information may also reside on a removable storage medium loaded into or installed in multipoint sensing devices when needed. By way of example, any of a number of suitable memory cards may be loaded into computing platform 902 on a temporary or permanent basis.

Controller 904 is also generally coupled to a variety of interfaces such as graphics control, video interface, input interface, output interface, and storage interface, and network interface, and these interfaces in turn are coupled to the appropriate devices. In certain embodiment, Controller 904 may connected to an input structure 914 and display 916 may be provided together, such an in the case of a touch-screen where a touch sensitive mechanism is provided in conjunction with the display 916. In such embodiments, the user may select or interact with displayed interface elements via the touch sensitive mechanism. In this way, the displayed interface may provide interactive functionality, allowing a user to navigate the displayed interface by touching the display 916.

Electric signals (e.g., analog) may be produced by microphone 910 and fed to earpiece 912. Controller 904 may receive instruction signals from input structure 914 and control the operation of display 916. By way of example, display 916 may incorporate liquid crystal display (LCD), light emitting diode (LED), Interferometric modulator display (IMOD), or any other suitable display technology. Audio signals may be transmitted and received by means of an antenna 918 that may be connected through a radio interface 920 or audio input interface such as microphone 924 to codec 922 configured to process signals under control of controller 904. Additionally, multipoint sensing devices may be powered power source 932.

Mobile device may also include one or more user input devices 934 (other than input structure 914) that are operatively coupled to the controller 904. Generally, input devices 934 are configured to transfer data, commands and responses from the outside world into multipoint sensing devices. By way of example, mobile device may include a keyboard or mouse. Input devices 934 may also include one or more hard buttons.

Display device 916 is generally configured to display a graphical user interface (GUI) that provides an easy to use visual interface between a user of the computing platform 902 and the operating system or application(s) running on the mobile device. Generally, the GUI presents programs, files and operational options with graphical images. During operation, the user may select and activate various graphical images displayed on the display 916 in order to initiate functions and tasks associated therewith.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 35 U.S.C. § 101. Herein, reference to a computer-readable storage medium excludes transitory forms of signal transmission (such as a propagating electrical or electromagnetic signal per se) to the extent that they are not eligible for patent protection under 35 U.S.C. § 101.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising, by one or more computing systems:
   receiving, from a first user of a social network, contact information for a second user of the social network, wherein the received contact information is stored in a private data structure associated with a profile of the second user, and wherein one or more privacy settings define or identify one or more third users of the social network who are excluded from accessing the received contact information;
   prompting the second user as to whether to allow at least one of the third users to access the received contact information;
   receiving a response from the second user;
   only when the response is affirmative, allowing the at least one of the third users to access the received contact information; and
   only when the response is negative:
      adding the received contact information to a private data structure associated with an address book of the first user, and
      linking the received contact information stored in the private data structure associated with the address book of the first user to public information stored in a public data structure, wherein the public information is from the profile of the second user.

2. The method of claim 1, wherein the first user is represented in a social graph by a first user node, and determining that the second user is a member of the social network comprises:
   for each of the set of user nodes one degree of separation from the first user node:
   accessing a user profile associated with the user node;
   searching the accessed user profile for information matching the received contact information;
   and, in response to a match, determining that the second user is represented by the user profile containing the matching information on the social network.

3. The method of claim 2, further comprising:
   if no matches are found within the set of user nodes one degree of separation from the first user node:
   incrementing the degree of separation; and
   repeating the search.

4. The method of claim 3, further comprising, repeating the search for each subsequent degree of separation until all user nodes are searched, or a match is found.

5. The method of claim 3, further comprising, repeating the search for a predetermined number of degrees of separation.

6. The method of claim 1, wherein receiving the contact information comprises receiving a synchronization message from the first user's mobile device.

7. The method of claim 1, wherein receiving the contact information comprises receiving an upload of data stored on a SIM card of the first user's mobile device.

8. The method of claim 1, wherein receiving the contact information comprises receiving a CSV file from the first user.

9. The method of claim 1, further comprising:
receiving, from the second user, a request for the received contact information associated with the second user; and
providing, to the second user, access to the received contact information stored in the private data structure associated with the address book of the first user.

10. The method of claim 1, further comprising:
receiving, from the at least one of the third users, a request for the received contact information associated with the second user; and
only when the response is negative, denying, to the third user, access to the received contact information stored in the private data structure associated with the address book of the first user.

11. The method of claim 1, wherein the received contact information stored in the private data structure associated with the address book of the first user is accessible for display to the first user alongside the public information stored in the public data structure, wherein the public information is from the profile of the second user.

12. An apparatus comprising:
one or more non-transitory computer readable storage media embodying software; and
one or more processors coupled to the storage media and operable to execute the software to:
receive, from a first user of a social network, contact information for a second user of the social network, wherein the received contact information is stored in a private data structure associated with a profile of the second user, and wherein one or more privacy settings define or identify one or more third users of the social network who are excluded from accessing the received contact information;
prompt the second user as to whether to allow at least one of the third users to access the received contact information;
receive a response from the second user;
only when the response is affirmative, allow the at least one of the third users to access the received contact information; and
only when the response is negative:
add the received contact information to a private data structure associated with an address book of the first user, and
link the received contact information stored in the private data structure associated with the address book of the first user to public information stored in a public data structure, wherein the public information is from the profile of the second user.

13. The apparatus of claim 12, wherein the first user is represented in a social graph by a first user node; and the one or more processors that are operable to execute the software to determine that the second user is a member of the social network comprise one or more processors that are operable to execute the software to, for each of the set of user nodes one degree of separation from the first user node:
access a user profile associated with the user node;
search the accessed user profile for information matching the received contact information;
and, in response to a match, determine that the second user is represented by the user profile containing the matching information on the social network.

14. The apparatus of claim 13, wherein the processors are further operable to execute the software to:
if no matches are found within the set of user nodes one degree of separation from the first user node, increment the degree of separation; and
repeat the search.

15. The apparatus of claim 14, wherein the processors are further operable to execute the software to repeat the search for each subsequent degree of separation until all user nodes are searched, or a match is found.

16. The apparatus of claim 14, wherein the processors are further operable to execute the software to repeat the search for a predetermined number of degrees of separation.

17. The apparatus of claim 12, wherein the processors that are operable to execute the software to receive the contact information comprise processors that are operable to execute the software to receive a synchronization message from the first user's mobile device.

18. The apparatus of claim 12, wherein the processors that are operable to execute the software to receive the contact information comprise processors that are operable to execute the software to receive an upload of data stored on a SIM card of the first user's mobile device.

19. A non-transitory computer-readable storage media embodying software that is operable when executed to:
receive, from a first user of a social network, contact information for a second user of the social network, wherein the received contact information is stored in a private data structure associated with a profile of the second user, and wherein one or more privacy settings define or identify one or more third users of the social network who are excluded from accessing the received contact information;
prompt the second user as to whether to allow at least one of the third users to access the received contact information;
receive a response from the second user;
only when the response is affirmative, allow the at least one of the third users to access the received contact information; and
only when the response is negative:
add the received contact information to a private data structure associated with an address book of the first user, and
link the received contact information stored in the private data structure associated with the address book of the first user to public information stored in a public data structure, wherein the public information is from the profile of the second user.

* * * * *